United States Patent [19]

Anthonsen

[11] Patent Number: 4,731,285

[45] Date of Patent: Mar. 15, 1988

[54] WATER-RESISTANT PHOTOGRAPHIC PAPER SUPPORT

[75] Inventor: Reiner Anthonsen, Bramsche, Fed. Rep. of Germany

[73] Assignee: Felix Schoeller, Jr. GmbH & Co. KG, Osnabruck, Fed. Rep. of Germany

[21] Appl. No.: 905,281

[22] Filed: Sep. 8, 1986

[30] Foreign Application Priority Data

Oct. 9, 1985 [DE] Fed. Rep. of Germany ....... 3535954

[51] Int. Cl.[4] ........................ B32B 5/16; B32B 27/08; G03C 1/86

[52] U.S. Cl. .................................... 428/323; 428/514; 428/516; 427/44; 427/35; 430/538

[58] Field of Search .......................... 427/44; 430/538; 428/323, 514

[56] References Cited

U.S. PATENT DOCUMENTS 4,554,175 11/1985 Shibue et al. ........................ 427/44

4,614,688 9/1986 Tamagawa et al. ............ 430/538 X 4,645,736 2/1987 Anthonsen et al. .............. 427/44 X

*Primary Examiner*—P. C. Ives

*Attorney, Agent, or Firm*—Lockwood, Alex, FitzGibbon & Cummings

[57] ABSTRACT

There is described a water-resistant paper support for photographic purposes with at least one coating which is hardened by electron beams, wherein the resin layer forming the coating contains acrylated or methacrylated phosphoric acid with a ratio of acrylate or methacrylate groups to acid groups of 1:2 to 2:1, or itaconic acid, and wherein this acrylated or methacrylated phosphoric acid or the itaconic acid in the resin mixture forming the coating amounts to 1 to 15 weight %, and preferably 4 to 10 weight %, relative to the entire mixture, and the acrylated or methacrylated phosphoric acid possesses an average molecular weight of 400 to 600.

12 Claims, No Drawings

WATER-RESISTANT PHOTOGRAPHIC PAPER SUPPORT

The invention concerns a water-resistant paper support for photographic purposes, which contains, on at least one side, a coating which is hardened by means of electron beams.

Water-resistant coated paper supports for photographic purposes are already known in various forms of execution. Papers provided with extruded polyolefine layers have found particularly wide application.

U.S. Pat. Nos. 4,384,040, 4,364,971 and 4,554,175, which have recently become known, describe paper supports, the base paper of which is provided with at least one coating produced in situ by means of electron beam hardening.

Coatings hardened by electron beams possess, in comparison with the polyolefin coatings, improved characteristics, such as, for example, increase in scratch resistance, increase in pigment receptivity, or increase in surface evenness. They are, like, polyolefin coatings, resistant to photographic process solutions, and thus protect the paper support positioned thereunder against the penetration of these solutions.

The process length and, in particular, the washing process are thereby decisively shortened.

The coatings hardened by electron beams are produced in accordance with U.S. Pat. No. 4,384,040 or U.S. Pat. No. 4,364,971, since a coatable mixture is applied to the surface of the paper, equalized there, and subsequently solidified, under a protective gas or other covering, with electron beams.

The mixtures contain, as a decisive component, at least one substance with ethylenically unsaturated double bonds, which have the capability of having polymerizing reactions with one another, if these are initiated by ionizing irradiation.

All compounds with ethylenically unsaturated double bonds e.g. vinyl or vinylidene compounds are suitable substances. Preferably used are substances which contain acrylate or methacrylate groups, for example, hexanedioldiacrylate, trimethylolpropanetriacrylate, polyesteracrylate, polyurethane acrylate, polyetheracrylate, polyepoxidacrylate or alkyd resin acrylate. In addition, esters of maleic acid, fumaric acid, mesaconic acid, citraconic acid or itaconic acid, other derivatives of these acids, allyl compounds, as well as linear and cyclical dienes or trienes can be used as reactive mixture components. The mixture should preferably contain at least one substance which contains two or more double bonds.

The flow properties of hardenable mixtures are adjusted by mixing of components with different molecular weights.

In addition to the reactive components, even non-reactive substances without double bonds can be contained to a limited extent in a mixture.

Furthermore, the mixtures for the coatings which can be hardened by electron beams may contain pigments, coloring substances, optical brighteners, image stabilizers, anti-oxidants or other additives, as far as this is desirable or necessary in regard to the desired properties of a photographic image.

The photographic layers are, after suitable preliminary treatment of the coating hardened by means of electron beams, applied to the surface of the hardened coating either directly or after previous application of an intermediary layer which mediates the adhesion. These photographic layers, are preferably such layers as are known under the concept "silver salt photography", and which serve to produce black and white or color images.

Although coatings hardened by electron beams have several advantages relative to polyolefin coatings, they have still some disadvantages.

Advantageous relative to polyolefin coatings is, for example, the increased pigment receptivity of the coatings hardened by means of electron beams. To improve the degree of whiteness or to improve the resolution or image sharpness of a photographic image, the highest possible content of white pigment, such as for example, titanium oxide, is desirable. Up to 70 weight % of white pigment can be added to a resin mixture for coatings which can be hardened by means of electron beams. However with large quantities of white pigment, the hardened layer is so brittle that tension cracks soon arise, or the layer only poorly adheres to the base.

It is, furthermore, disadvantageous that the coatings hardened by means of electron beams behave variously relative to various photographic process solutions. Thus, it was found that, during the use of such photographic color developers as are commonly available commercially which contain aromatic amine derivatives, such as for example, derivatives of phenyldiamine, toluidine, and others, a yellow discoloration of the surface of the irradiation-hardened coating arises.

This discoloration is sure, slight, but it is clearly discernible, and can neither be impeded by the stop bath nor by thorough washing.

It appears both in pigment-free coatings, as well as in coatings pigmented with white pigment, whereby as a rule, the discoloration is stronger with pigment-containing coatings than with pigment-free coatings.

The discoloration arises neither with polyolefin surfaces, nor is it to be observed in the classical baryta papers.

In the German patent application DOS No. 34 15 215 a method is described to obtain coatings with reduced coloration by means of special compositions of the hardenable components of a coating mixture. The process described there is based on the fact that unsaturated hydroxy-functional compounds are contained in the coating mixtures in a molar concentration of 2 or more than 2.

The German patent application DOS No. 34 35 639 describes the use of a special titanium oxide as a white pigment to reduce the coloration of the coating hardened by electron beams in photographic color developers. The special titanium dioxide employed carries a surface coating which amounts to at least 2 weight % of the entire pigment. The surface coating is an inorganic oxide or oxide hydrate, and can be an oxide of aluminum, silicon, zinc, magnesium, tin, zirconium, antimony or an alkaline earth metal, or mixtures of such compounds.

Both methods described lead to a reduction of the yellow coloration of the beam-hardened coating during the use of color developers. It is, however, disadvantageous to the solutions that there is a severe limitation in the selection of mixture components in accordance with DOS No. 34 15 215 or in the use of white pigment in accordance with DOS No. 34 35 639, as well as with the brittleness of the coating which appears with higher pigment quantities.

It is thus the objective of the present invention to create a water-resistant paper support, for photographic purposes, which is provided with a coating which is hardened by means of electron beams, and does not have the disadvantages described, and which particularly after treatment with photographic developer solutions of any type, displays no visible tendency towards yellow discoloration. No visible tendency to yellow discoloration is defined as occuring when the determination of the optical density according to DIN No. 4512, as measured with yellow filter over white background, shows changes which are smaller than 0.03.

The effect in accordance with the invention arises particularly by using such substances in which, in addition to free acid groups, reactive unsaturated groups are present.

In accordance with the invention, acrylated or methacrylated phosphoric acid is used, with average molecular weights of 400 to 600, or else itaconic acid.

The portion of reactive, unsaturated groups determines the extent of fixing (anchoring) the substances in the coating hardened by means of electron beams.

As stated in DOS No. 34 15 215 and DOS No. 34 35 639 irradiation-hardened coatings which have acrylates, methacrylates or allyl compounds as unsaturated compounds, tend particularly strongly to discolor with color developers which contain an aromatic amine derivative. The binder portion, which contains unsaturated groups, was held responsible for the appearance of discoloration.

It is thus surprising that the substances used in accordance with the invention which likewise contain unsaturated groups, impede the discoloration in the color developer baths mentioned above.

The acrylated or methacrylated phosphoric acids used in accordance with the invention have a ratio of reactive, unsaturated groups to polar acid groups of 1:2 to 2:1. That is, per each molecule there are on an average present, for example, 1.5 free acid groups and 1.5 acrylate or methacrylate groups.

Itaconic acid has a ratio of unsaturated to polar groups of 1:2, and is likewise suitable.

The substances in accordance with the invention can be added in quantities of 1 to 15 weight %, and preferably, however, 4 to 10 weight %, relative to the coating mixture.

Within the framework of the invention, it is unimportant whether the coatings hardened with electron beams contain additional additives, such as are normal in such types of photographic supports.

Rather, the selection of type and quantity of the white pigment, among known or conceivable white pigments, with or without surface coating, is completely free, without the effect in accordance with the invention being disadvantageously influenced.

Likewise, the selection of the various components is completely free as to the production of beam-hardenable coating mixtures with the known substances already described for the production of these mixtures (for example, in accordance with U.S. Pat. No. 4,384,040 or U.S. Pat. No. 4,364,971), as well as other, conceivably suited substances.

Likewise, in addition to the white pigment, color pigments of any type, as well as auxiliary dispersion agents, coloring substances and other substances favorably influencing the image quality can also be added to the coating mixtures without negatively influencing the effect in accordance with the invention.

The coatings in accordance with the invention can be produced and solidified in the desired manner in accordance with one of the known processes, and can have various surface structures (for example, in accordance with U.S. Pat. No. 3,959,546; U.S. Pat. No. 4,364,971 or DOS No. 34 15 215).

As a rule, the base paper is also coated in a water-resistant manner on the opposite side. This coating can likewise consist of a mixture in accordance with the invention, but can also consist of polyolefin. Also, several similar or different coatings can be applied above one another.

It is decisive that in using the substances in accordance with the invention in the mixtures for electron beam-hardenable coatings, the discoloration in the color developer baths is prevented. Moreover, the hardened layer is scratch-resistant, and furthermore has, even with a high pigment content, sufficient elasticity to avoid tension cracks, and a satisfactory adhesion strength of the layer on the base paper is attained.

The concept in accordance with the invention is illustrated in the following examples.

EXAMPLE 1

A base mixture of:

50 weight % polyestertetraacrylate ($\overline{M}$ ca. 1000);
30 weight % glyceroltriacrylate;
20 weight % hexanedioldiacrylate;

was divided into equal parts, and mixed with acrylated phosphoric acid with the molecular weight of 500 and, on average, 1.5 acrylate, as well as 1.5 free acid groups, per molecule, in the following quantities:

1a: 0 weight % (comparison)
1b: 1 weight %
1c: 2 weight %
1d: 4 weight %
1e: 6 weight %
1f: 8 weight %
1g: 10 weight %
1h: 12 weight %
1i: 15 weight %

A base paper, internal sized by means of alkylketenedimer in the neutral pH-range, having a basis weight of approximately 150 g/m$^2$ was coated with one of the coating mixtures 1a to 1i.

The coating weight amounted to about 20 g/m$^2$. The coating was hardened, under nitrogen, by means of electron beams, using an energy dose of 40 kJ/kg.

EXAMPLE 2

A base mixture of:

50 weight % polyestertetraacrylate ($\overline{M}$ ca. 1000);
30 weight % glyceroltriacrylate;
20 weight % hexanedioldiacrylate;

was divided into equal parts and mixed with methacrylated phosphoric acid with the approximate molecular weight of 500, and, on average, 1.5 methacrylate as well as 1.5 free acid groups per molecule, in the following quantities:

2a: 0 weight % (comparison)
2b: 1 weight %
2c: 2 weight %
2d: 4 weight %
2e: 6 weight %
2f: 8 weight %

2g: 10 weight %
2h: 12 weight %
2i: 15 weight %

A base paper, having a basis weight of approximately 150 $g/m^2$, hydrophobized by means of alkylketenedimer in the neutral pH-range, was coated with one of the coating mixtures 2a to 2i.

The coating weight amounted to approximately 20 $g/m^2$. The coating was hardened, under nitrogen, by means of electron beams, using an energy dose of 40 kJ/kg.

EXAMPLE 3

A base mixture of:
50 weight % polyestertetraacrylate ($\overline{M}$ ca. 1000);
30 weight % glyceroltriacrylate;
20 weight % hexanedioldiacrylate;
was divided into equal parts, and mixed with itaconic acid with the following quantities:

3a: 0 weight % (comparison)
3b: 1 weight %
3c: 2 weight %
3d: 4 weight %
3e: 6 weight %
3f: 8 weight %
3g: 10 weight %
3h: 12 weight %
3i: 15 weight %

A base paper, having a basis weight of approximately 150 $g/m^2$, hydrophobized by means of alkylketenedimer in the neutral pH-range, was coated with one of the coating mixtures 3a to 3i.

The coating weight amounted to about 20 $g/m^2$. The coating was hardened, under nitrogen, by means of electron beams, using an energy dose of 40 kJ/kg.

EXAMPLE 4

A base mixture of:
62 weight % polyestertetraacrylate ($\overline{M}$ ca. 1000);
23 weight % glyceroltriacrylate;
15 weight % hexanedioldiacrylate;
was divided into equal parts and mixed with the substances in accordance with the invention, in the following quantities:
4a: 7 weight % acrylated phosphoric acid
4b: 7 weight % methacrylated phosphoric acid
4c: 7 weight % monomer itaconic acid A base paper, having a basis weight of approximately 150 $g/m^2$, hydrophobized by means of alkylketenedimer in the neutral pH-range, was coated with one of the coating mixtures 4a to 4c.

The coating weight amounted to about 20 $g/m^2$. The coating was hardened, under nitrogen, by means of electron beams, using an energy dose of 40 kJ/kg.

EXAMPLE 5

A base mixture of:
70 weight % triethyleneglycoldiacrylate, and
30 weight % pentaerythritoltriacrylate
was divided into equal parts, and mixed with the substances in accordance with the invention, in the following quantities:
5a: 7 weight % acrylated phosphoric acid
5b: 7 weight % methacrylated phosphoric acid
5c: 7 weight % monomer itaconic acid A base paper, having a basis weight of approximately 120 $g/m^2$, hydrophobized using sebacic acid soaps, was coated with one of the coating mixtures 5a to 5c.

The coating weight amounted to about 20 $g/m^2$. The coating was hardened, under nitrogen, by means of electron beams, using an energy dose of 40 kJ/kg.

EXAMPLE 6

A base mixture of:
40 weight % polyestertetraacrylate ($\overline{M}$ ca. 1000);
30 weight % trimethylolpropanetriethoxytriacrylate;
20 weight % hexanedioldiacrylate;
10 weight % polyethyleneglycoldiacrylate (MW of the polyethylenglycol ca. 400);
was divided into equal parts, and mixed with phosphoric acid, used in accordance with the invention, in the following quantities:
6a: 0 weight % (comparison)
6b: 10 weight %

A base paper, having a basis weight of approximately 150 $g/m^2$, hydrophobized by means of alkylketenedimer in the neutral pH-range, was coated with one of the coating mixtures 6a and 6b.

The coating weight amounted to about 20 $g/m^2$. The coating was hardened, under nitrogen, by means of electron beams, using an energy dose of 40 kJ/kg.

EXAMPLE 7

A base mixture of:
28 weight % polyestertetraacrylate ($\overline{M}$ ca. 1000);
21 weight % trimethylolpropanetriethoxytriacrylate;
14 weight % hexanedioldiacrylate;
7 weight % polyethylenglycoldiacrylate;
30 weight % $TiO_2$, without surface treatment, Rutile type;
was divided into equal parts, and mixed with phosphoric acid used in accordance with the invention, in the following quantities:
7a: 0 weight % (comparison)
7b: 10 weight %

A base paper, having a base weight of approximately 120 $g/m^2$, hydrophobized using sebacic acid soaps, was coated with one of the two coating mixtures 7a and 7b. The coating weight amounted to about 20 $g/m^2$. The coating was hardened, under nitrogen, by means of electron beams, using an energy dose of 40 kJ/kg.

TEST OF THE SUPPORT MATERIALS

To test the paper support coated with the coating mixtures from examples 1 to 6, one sample of each was folded in the form of a ship, and exposed for 15 minutes, at 30° C., to commercially available color developers.

The folding ensures that one part of the sample comes in contact with the developer solution, so that a direct comparison between the treated and the untreated surfaces is possible on the same sample.

After treatment with the color developer, the sample was soaked for 2 hours, mechanically dried out, and subsequently stored for four days at room temperature, and under the effect of daylight.

After the end of the storage period, the extent of yellow discoloration was densitometrically determined in accordance with DIN No. 4512.

DENSITOMETRIC TEST RESULTS

| | Densitometric test results: | | | | |
|---|---|---|---|---|---|
| Example | Δ D | Example | Δ D | Example | Δ D |
| 1a | 0.043 | 2a | 0.043 | 3a | 0.043 |
| 1b | 0.030 | 2b | 0.030 | 3b | 0.030 |
| 1c | 0.030 | 2c | 0.029 | 3c | 0.030 |
| 1d | 0.025 | 2d | 0.027 | 3d | 0.029 |
| 1e | 0.019 | 2e | 0.021 | 3e | 0.026 |
| 1f | 0.015 | 2f | 0.018 | 3f | 0.024 |
| 1g | 0.020 | 2g | 0.020 | 3g | 0.025 |
| 1h | 0.020 | 2h | 0.021 | 3h | 0.025 |
| 1i | 0.024 | 2i | 0.025 | 3i | 0.028 |
| 4a | 0.018 | | | | |
| 4b | 0.019 | | | | |
| 4c | 0.025 | | | | |
| 5a | 0.019 | | | | |
| 5b | 0.017 | | | | |
| 5c | 0.026 | | | | |
| 6a | 0.085 | | | | |
| 6b | 0.026 | | | | |
| 7a | 0.100 | | | | |
| 7b | 0.028 | | | | |

I claim:

1. A water-resistant photographic paper support with at least one coating of a resin mixture thereon which is hardened by electron beams, wherein said resin mixture for the coating contains acrylated or methacrylated phosphoric acid or itaconic acid.

2. The water-resistant photographic paper support of claim 1, wherein the acrylated or methacrylated phosphoric acid has a ratio of acrylate or methacrylate groups to acid groups of about 1:2 to 2:1.

3. The water-resistant photographic paper support of claim 2, wherein the acrylated or methacrylated phosphoric acid or the itaconic acid is present in said resin mixture prior to hardening by the electron beams at levels of about 1 to 15 weight % relative to the total quantity of said resin mixture.

4. The water-resistant photographic paper support of claim 2, wherein the acrylated or methacrylated phosphoric acid or the itaconic acid is present in said resin mixture prior to hardening by the electron beams at levels of about 4 to 10 weight % relative to the total quantity of said resin mixture.

5. The water-resistant photographic paper support of claim 2, wherein the acrylated or methacrylated phosphoric acid has an average molecular weight of about 400 to 600.

6. The water-resistant photographic paper support of claim 2, wherein the acrylated or methacrylated phosphoric acid contains, on average, about 1.5 acrylate or methacrylate groups and about 1.5 acid groups per molecule.

7. The water-resistant photographic paper support of claim 2, wherein the resin mixture contains a white pigment.

8. The water-resistant photographic paper support of claim 1, wherein the acrylated or methacrylated phosphoric acid or the itaconic acid is present in said resin mixture prior to hardening by the electron beams at levels of about 1 to 15 weight % relative to the total quantity of said resin mixture.

9. The water-resistant photographic paper support of claim 1, wherein the acrylated or methacrylated phosphoric acid or the itaconic acid is present in said resin mixture prior to hardening by the electron beams at levels of about 4 to 10 weight % relative to the total quantity of said resin mixture.

10. The water-resistant photographic paper support of claim 1, wherein the acrylated or methacrylated phosphoric acid has an average molecular weight of about 400 to 600.

11. The water-resistant photographic paper support of claim 1, wherein the acrylated or methacrylated phosphoric acid contains, on average about 1.5 acrylate or methacrylate groups and about 1.5 acid groups per molecule.

12. The water-resistant photographic paper support of claim 1, wherein the resin mixture contains a white pigment.

* * * * *

UNITED STATES PATENT AND TRADEMARK OFFICE

CERTIFICATE OF CORRECTION

PATENT NO. : 4,731,285

DATED : March 15, 1988

INVENTOR(S) : Reiner Anthonsen

It is certified that error appears in the above-identified patent and that said Letters Patent is hereby corrected as shown below:

In col. 2, line 31, delete "sure,".

In col. 3, line 45, delete ", however,".

In col. 6, line 36, delete "polyethylenglycoldiacrylate" and insert -- polyethyleneglycoldiacrylate --.

Signed and Sealed this

Tenth Day of January, 1989

*Attest:*

DONALD J. QUIGG

*Attesting Officer*

*Commissioner of Patents and Trademarks*